(12) United States Patent
Kaminski

(10) Patent No.: US 11,214,425 B2
(45) Date of Patent: Jan. 4, 2022

(54) METHOD FOR INFLATING AIRBAGS

(71) Applicant: Michael G Kaminski, San Jose, CA (US)

(72) Inventor: Michael G Kaminski, San Jose, CA (US)

(*) Notice: Subject to any disclaimer, the term of this patent is extended or adjusted under 35 U.S.C. 154(b) by 0 days.

(21) Appl. No.: 17/073,269

(22) Filed: Oct. 16, 2020

(65) Prior Publication Data

US 2021/0031481 A1 Feb. 4, 2021

Related U.S. Application Data

(63) Continuation-in-part of application No. 16/826,173, filed on Mar. 21, 2020, now Pat. No. 10,837,432.

(51) Int. Cl.
| | |
|---|---|
| *B65D 81/03* | (2006.01) |
| *B65D 33/20* | (2006.01) |
| *B65B 55/20* | (2006.01) |
| *B65D 81/05* | (2006.01) |
| *B31D 5/00* | (2017.01) |
| *B29D 22/02* | (2006.01) |

(52) U.S. Cl.
CPC .......... *B65D 81/052* (2013.01); *B29D 22/02* (2013.01); *B31D 5/0073* (2013.01)

(58) Field of Classification Search
None
See application file for complete search history.

(56) References Cited

U.S. PATENT DOCUMENTS

| | | | |
|---|---|---|---|
| 6,569,283 B1* | 5/2003 | Sperry | B29C 66/43121 156/583.2 |
| 10,786,960 B2* | 9/2020 | Sperry | B29D 22/02 |
| 2003/0035598 A1* | 2/2003 | Hiraiwa | B65D 31/04 383/205 |
| 2009/0158691 A1* | 6/2009 | Wehrmann | B29C 65/224 53/403 |
| 2014/0260094 A1* | 9/2014 | Wehrmann | B65B 55/00 53/403 |
| 2014/0270584 A1* | 9/2014 | Exner | B31B 50/81 383/61.1 |
| 2014/0314978 A1* | 10/2014 | Lepine | B65B 55/20 428/35.2 |
| 2015/0225126 A1* | 8/2015 | Sharpe | B65D 33/34 383/5 |
| 2017/0225813 A1* | 8/2017 | Wehrmann | B65B 43/267 |
| 2019/0263081 A1* | 8/2019 | Wehrmann | B31B 70/81 |
| 2020/0024059 A1* | 1/2020 | Wetsch | B31D 5/0073 |
| 2021/0086973 A1* | 3/2021 | Stack, Jr. | B65D 81/052 |

* cited by examiner

*Primary Examiner* — Praachi M Pathak
(74) *Attorney, Agent, or Firm* — Barry Choobin; Patent 360

(57) ABSTRACT

Disclosed is a method for inflating packaging airbags. The method for inflating the airbags include the steps of coupling an inflation port of the airbag to a nozzle of the inflation system, wherein a collar of the airbag adjacent to the inflation port lies between the cushions of the inflation system, the cushions are a part of pair of clamps. Thereafter the inflation system can be turned on resulting in clasping of the collar by the pair of clamps. The air compressor of the system operates to supply air under pressure to the airbag through the air pressure regulator. Once the airbag is inflated, the inflation system can be turned off, resulting in releasing of the pair of clamps, thus releasing the airbag.

11 Claims, 17 Drawing Sheets

METHOD FOR INFLATING AIRBAGS

CROSS-REFERENCE TO RELATED APPLICATIONS

This application is a continuation-in-part of a U.S. Non-provisional patent application Ser. No. 16/826,173 filed Mar. 21, 2020, which claims priority to the U.S. provisional patent application Ser. No. 62/889,564 filed Aug. 21, 2019, both of which are incorporated herein by reference in its entirety.

This application also claim priority to a U.S. provisional patent application Ser. No. 62/940,594 filed Nov. 26, 2019, which is incorporated herein by reference in its entirety.

FIELD OF INVENTION

The present invention relates to a method for inflating airbags, and more particularly, the present invention relates to a semi-automated method for inflating airbags.

BACKGROUND

The packaging is a means to protect an article from contamination, dirt, and damage. The packaging is of utmost significance in the manufacture, sale, and transport of articles. The primary purpose of the packaging is to protect an article from the environment. For example, packaging can protect an article from dust, water, etc. Also, the packaging has a primary function to protect an article from external shocks and bumps. This function of packaging is of importance in the transportation of fragile articles which are very suspectable to damage during transportation. Good packaging can protect an article from damage due to shocks or bumps both during transportation and mishandling of the article.

Different kinds of packaging materials are commercially available, such as paper, plastic, and cardboard. Each packaging material has its own uses and indications. The paper can be used to protect an article from dirt. The plastic can protect an article from both dirt and liquid. Cardboards, on the other hand, are sturdy and can provide limited protection against shocks. For enhanced protection against shocks, materials such as Styrofoam, foam, bubble packs, crumpled paper, or airbags, each being inserted inside a bag or container are popularly used.

Airbags are bags that have to air as a cushioning material to protect an article contained in the bag. The airbag can be made of polyethylene or other materials having comparable properties. The airbag is manufactured as a sheet having two overlapping plies. The two plies have air cavities which can be inflated with air. The airbag can be manufactured in the form of a container. For example, airbag containers are used to contain glass bottles for protection against bumps. Such airbag containers have become quite popular for the transportation of wine bottles. At retail outlets, costly glass articles, such as wine bottles are packed in airbag containers for protection against bumps. The airbag container is available as a sheet, which is inflated by a manual air pump. However, the use of manual pumps is both laborious and time-consuming. Thus, a need is appreciated for a method for semi-automated to automated methods for inflating the airbags.

SUMMARY OF THE INVENTION

The principal object of the present invention is therefore directed to a method for inflating airbags.

It is an additional object of the present invention that the method provides automated inflation of airbags.

In one aspect, the present invention is directed to a method for inflating airbags. The method comprises providing an inflation system, the inflation system having an air compressor housed in a compact housing. The air compressor fluidly connected to an air pressure regulator for controlling the air pressure within pre-determined limits. An air hose connects an outlet of the air regulator to a nozzle, where the nozzle can couple to an inflation port of the airbag for inflating the airbag. The inflation system further includes a duckbill type clamp assembly, the clamp assembly comprises an upper clamp and a lower clamp positioned against each other. The upper clamp having a proximal end and a distal end, and the lower clamp having a proximal end and a distal end. The upper clamp is stationary, while the lower clamp is pivotally coupled near center of its length, resulting in the lower clamp to pivot around its pivot joint and relative to the first clamp. Each of the upper clamp and the lower clamp mounts an upper cushion and a lower cushion respectfully. The upper cushion and the lower cushion positioned near the proximal ends of the upper clamp and the lower clamp. The upper cushion and the lower cushion both having a longitudinal groove, which together forms a passageway for the air hose, the air hose connected to air pressure regulator at one end and to a nozzle at another end. Furthermore, the distal end of the lower clamp can be operably coupled to a pull type solenoid for pivoting the lower clamp relative to the upper clamp.

In one aspect, disclosed is an airbag configured with an inflatable liner, the inflatable liner having a front wall and a rear wall in a face to face relation, each of the front wall and rear wall comprises a series of inflatable tubes arranged side by side; each tube of the series of tubes having an opening, the series of tubes in fluid communication with a common air tube through the opening, one end of the common air tube configured as an inflation port, the opening of the each tube of the series of tubes is configured with a check valve, the check valve configured to allow air to enter the tube but restrict the leak of the filled air from the opening of the tube. The portions of the front wall and the rear wall around the inflation port forms a collar.

In one aspect, disclosed is a method for inflating the airbag, the method includes coupling the inflation port of the airbag to the nozzle of the inflation system. Once the inflation port of the airbag is coupled to the nozzle of the inflation system, the collar of the airbag lies between the upper cushion and the lower cushion of the inflation system. The inflation system can then be started which causes the lower clamp to pivot, wherein the lower cushion pushes the collar of the bag towards the upper cushion, thus retaining the collar of the bag while inflating the airbag. Thus, the airbag can be retained by the clamp, while inflating the airbag. Once, the airbag is filled, the inflation system can be turned off. Turning-Off the inflation system releases the clamp, thus releasing the airbag.

These and other objects and advantages of the embodiments herein will become readily apparent from the following detailed description taken in conjunction with the accompanying drawings

BRIEF DESCRIPTION OF THE DRAWINGS

The accompanying figures, which are incorporated herein, form part of the specification and illustrate embodiments of the present invention. Together with the description, the figures further explain the principles of the present

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is to describe particular embodiments only and is not intended to be limiting of embodiments of the invention. As used herein, the singular forms "a", "an" and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Figure 1:
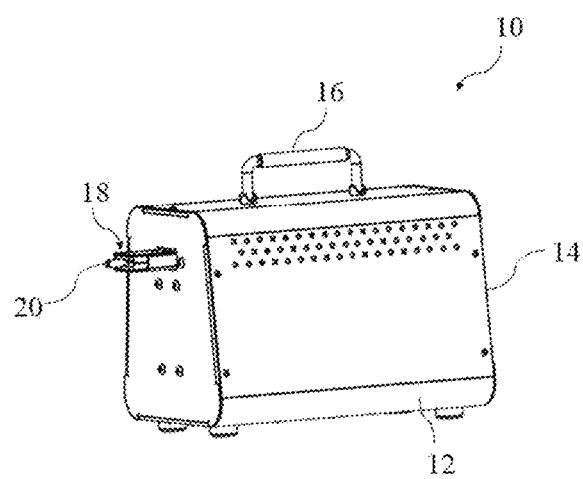
FIG. 1 is a front and side perspective view of an inflation system, according to an exemplary embodiment of the present invention.
Figure 2:
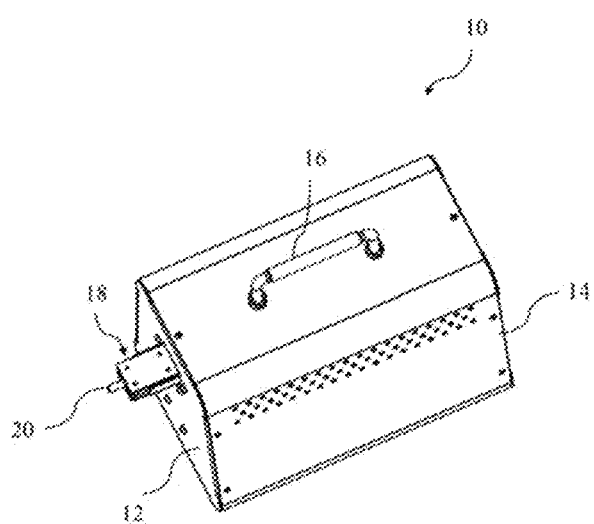
FIG. 2 is a top and front perspective view of the inflation system of FIG. 1, showing a handle and a clamp assembly.

The present invention is directed to a method for inflating a packaging airbag. FIG. 1 shows an exemplary embodiment of the disclosed inflation system that can be used to inflate the packaging airbags. Shown in FIG. 1 is the inflation system 10, according to an exemplary embodiment, that is compact and could be easily carried or placed on a table, hence also referred herein as a table-top inflation system. FIG. 1 shows a housing 12 which is covered by a thin sheet steel cover 14. The cover 14 is having a plurality of holes near the top portion for air circulation. Furthermore, the cover 14 is shown to be secured to the housing 12 through a plurality of screws. On top of the cover is a handle 16 that is integrated to the cover 14, the handle 16 can be used to carry the inflation system 10. The housing 12 can act as a frame to which different components of the inflation system 10 can be assembled. A clamp assembly 18 as shown in FIG. 1 protrudes from an opening provided on a side wall of the housing 12. A nozzle 20 can also be seen protruding from the clamp assembly 18. FIG. 2 shows a top and side perspective view of the inflation system 10 according to an exemplary embodiment of the present invention. The clamp assembly 18 can be more clearly seen, in FIG. 2, protruding from the opening in the housing 12. Also, the handle 16 can be seen clearly in FIG. 2 to be integrated to the cover 14.

Figure 3:
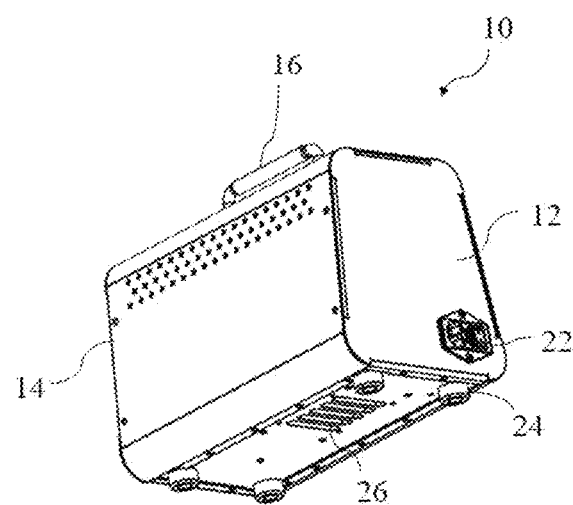
FIG. 3 is a bottom and side perspective view of the inflation system of FIG. 1, showing an air vent and a power interface.

FIG. 3 shows the bottom and side perspective view of the inflation system 10 in accordance with an exemplary embodiment of the present invention. A power interface 22 can be seen coupled to the housing 12, wherein the power interface 22 can have an input for a power cable and a switch for turning the inflation system 10 On and Off. On the bottom side of the housing 12, can be seen elongated perforations configured in a base of the housing 12. These perforations can act as an air vent 26 for receiving air into the housing 12.

Figure 4:
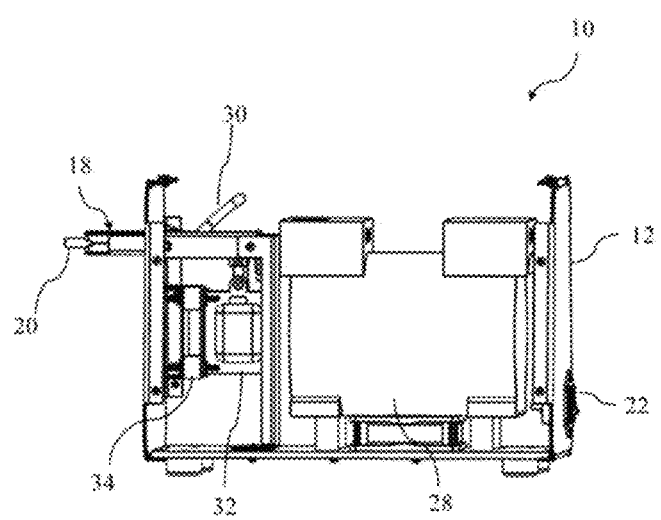
FIG. 4 is a side view of the inflation system of FIG. 1, showing the internal components of the inflation system.
Figure 5:
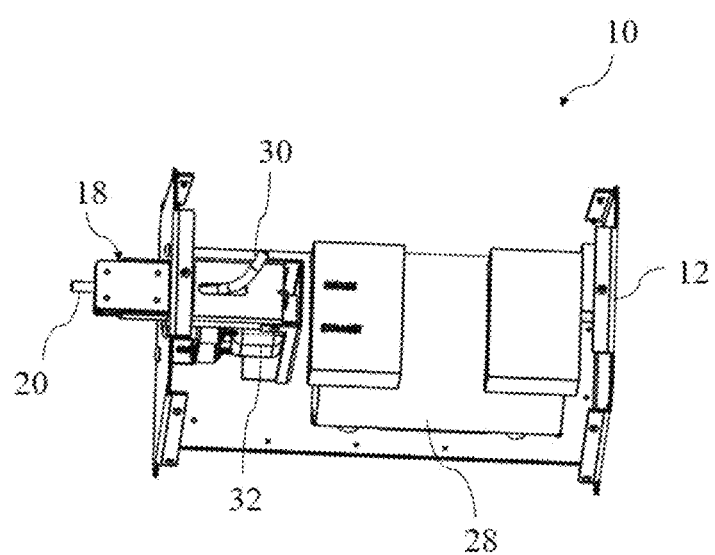
FIG. 5 is a top and front perspective view of the inflation system of FIG. 4, according to an exemplary embodiment of the present invention.

The different components of the inflation system 10 can be seen in FIG. 4. The air compressor 28 is mounted to the base of the housing 12. The air compressor 28 is preferably a low noise air compressor, and more preferably, a silent air compressor. In one case, a muffler can be provided at an air input of the air compressor 28 to decrease its noise. Construction and working of air compressors for portable inflation devices are known to a skilled person and all the known types of air compressors with or without tanks are within the scope of the present invention. The air compressor 28 can be connected to an input port of an air pressure regulator (not shown). The air pressure regulator controls the pressure of the compressed air from the air compressor 28 within the set limits. The limits of air pressure can be set by a user, wherein the limits of air pressure can depend upon the packaging airbags to the inflated by the inflation system 10. In a preferred embodiment, the air pressure can be regulated to be within the range of 8.8 to 10 PSI. In a more preferred embodiment, the air pressure can be set at 8.8 PSI. An air hose 30 connects an out port of the air pressure regulator to a nozzle 20. The air hose 30 can be seen more clearly in FIG. 5, wherein the end of the air hose 30 is shown open i.e. not coupled to the air pressure regulator. Further can be seen in FIG. 5 is the air hose 30 passing to the clamp assembly 18 through an elongated aperture in the clamp assembly 18. The clamp assembly can have a passageway for the air hose 30, wherein a portion of the nozzle 20 can protrude from the clamp assembly 18. Further can be seen in FIG. 4 is a solenoid 32 mounted to the housing 12 and operably coupled to the clamp assembly 18.

Figure 6:
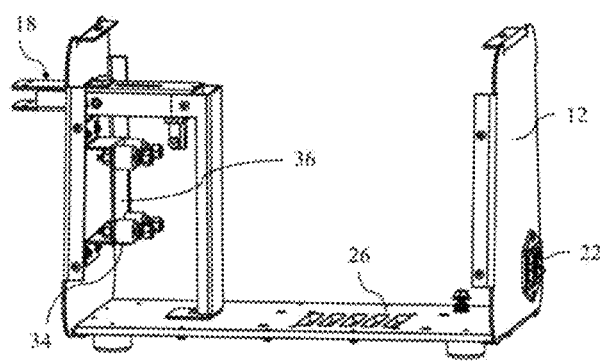
FIG. 6 is a side view of a housing showing a power socket, a clamp assembly, and a solenoid clamp, according to an exemplary embodiment of the present invention.
Figure 7:
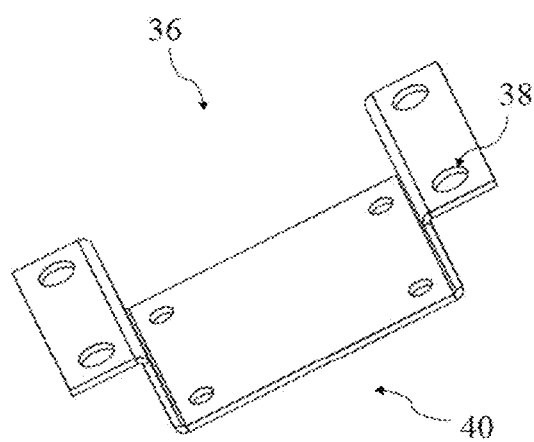
FIG. 7 shows the solenoid clamp, according to an exemplary embodiment of the present invention.

FIG. 6 shows the solenoid clamp 36 for mounting the solenoid 32 to the housing 12. Furthermore, could be seen in FIG. 6 are the air vent 26, power interface 22, clamp assembly 18, and the spacers 34. The solenoid clamp 36 can more be clearly seen in FIG. 7, which shows a clamp with two perpendicular flanges. The two flanges are having four apertures 38 for the bolts that are used to couple the solenoid clamp 36 to the housing 12. Another four apertures 40 can be used to couple the solenoid 32 through bolt and nuts. The spacing between the solenoid 32 and the solenoid clamp 36 can be adjusted through the spacers 34 shown in FIGS. 4 and 6. In a preferred embodiment, the spacers 34 can be made of any soft material that can dampen the vibrations, for example rubber is known to reduce the vibrations. Additionally, the bolts to secure the solenoid 32 to the clamp 36, and the clamp 36 to the housing can be incorporated with dampeners to reduce the vibrations. In one case, the bolts can be replaced with studs made of material that can decrease the vibrations.

Figure 8:
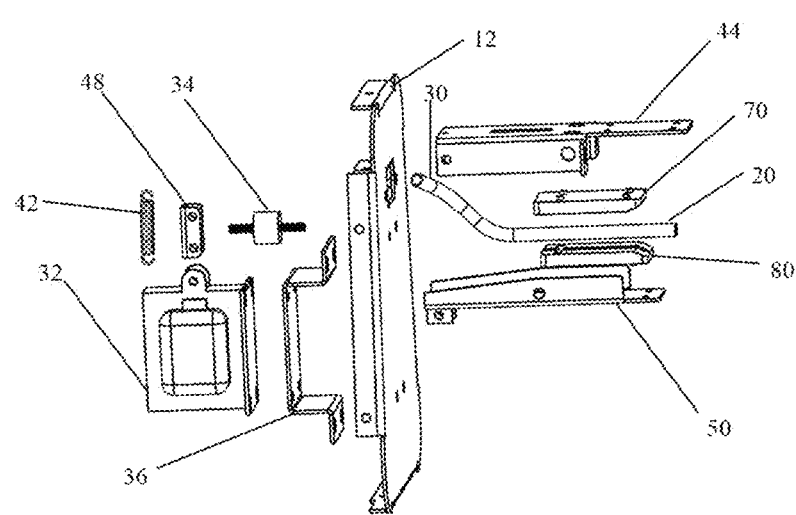
FIG. 8 is an exploded view of a portion of the inflation system showing the solenoid and the clamp assembly, according to an exemplary embodiment of the present invention.
Figure 9:
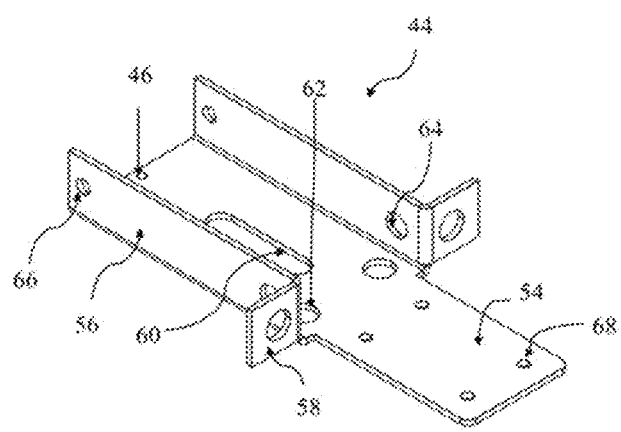
FIG. 9 is a perspective view of an upper clamp of the clamp assembly, according to an exemplary embodiment of the present invention.
Figure 10:
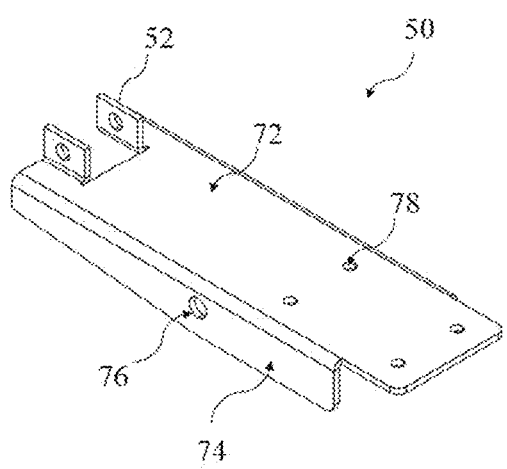
FIG. 10 is a bottom view of a lower clamp of the clamp assembly, according to an exemplary embodiment of the present invention.

FIG. 8 shows an exploded view of the front portion of the inflation system of FIG. 1 which showing the solenoid 32 and the clamp assembly 18. As discussed above, the solenoid 32 is mounted to the side of the housing 12 through the solenoid clamp 36. The space between the solenoid 32 and the solenoid clamp 36 can be adjusted using the spacers 34. FIG. 8 shows four such kind of spacers to adjust the space between the solenoid 32 and the solenoid clamp 36. Furthermore, it can be seen in FIG. 8 is a piston extension spring 42 coupled to the solenoid 32. The solenoid 32 is a pull type solenoid, wherein the piston extension spring 42 can be coupled to a piston 48 of solenoid 32, to keep the piston in extended configuration. Thus, one end of the piston extension spring 42 can be coupled to the piston 48 of the solenoid 32, while the other end of the piston extension spring 42 can hook to a stationary upper clamp 44 of the clamp assembly 18. An embodiment of the upper clamp 44 is shown in FIG. 9 which has a small aperture 46 to which the piston extension spring 42 can hook. The piston 48 can be operably coupled to the lower clamp 50 to pivot the lower clamp 50 relative to the stationary upper clamp 44. The piston 48 can be secured to the perpendicular flanges 52 that extends downwards in the lower clamp 50. An embodiment of the lower clamp 50 is shown in FIG. 10, which has a pair of flanges 52 that extends downwards and perpendicular to a base 72 of the lower clamp 50. In one case, the piston 48 can be secured to the flanges 52 of the lower clamp 50 using fasteners, such as but not limited to nut and bolt.

The clamp assembly 18 can now be explained with the help of FIGS. 8-11, as having an upper clamp 44 and a lower clamp 50. The upper clamp having a proximal end and a distal end. The upper clamp 44 is more clearly shown in FIG. 9 as having a flat base 54, a pair of first flanges 56 that extends perpendicularly from opposite edges of the base 54, and another pair of second flanges 58 that are perpendicular to the first pair of flanges 56 and the base 54. The first pair of flanges 56 can extend from distal end of the upper clamp 44 up to near the center. The first pair of flanges 56 terminate into the second pair of flanges 58. The upper clamp 44 can be coupled to the housing 12 at the second pair of flanges 58, such that the proximal end of the first pair of flanges 56 can protrude from the opening of the housing 12. The elongated aperture 60 can be seen configured in the base 54 of the upper clamp 44 which can receive the air hose 30. The two apertures 62 in the base 54 of the upper clamp 44 can be used to further secure the upper clamp 44 to the housing 12. As discussed before, the aperture 46 can be used to hook the piston extension spring 42. The two apertures 64 in the first pair of flanges 56 and positioned near the center of the upper clamp 44, can be used to secure the lower clamp 50. The two apertures 66 again in the first pair of flanges 56 and at the distal ends can also be used to secure the upper clamp 44 to the housing 12. The upper clamp 44 is shown in FIG. 8 to be positioned above the lower clamp 50, with the base 54 facing upwards. The four small apertures 68 in the base 54 near the proximal ends of the upper clamp 44 can be used to secure the upper cushion 70.

Figure 11:
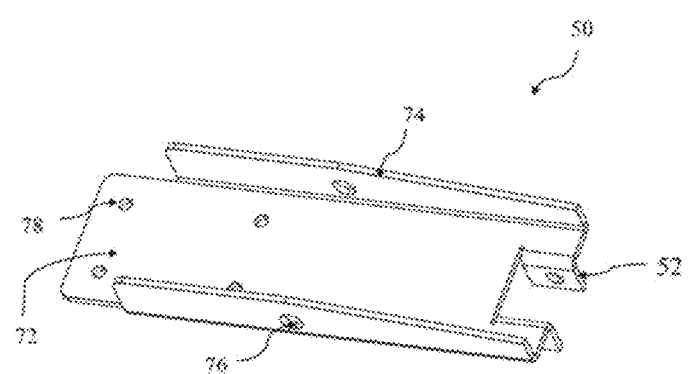
FIG. 11 is a top and side perspective view of the lower clamp of FIG. 10, according to an exemplary embodiment of the present invention.

The lower clamp is shown in FIGS. 10 and 11 as having a base 72 and pair of flanges 74 that extends perpendicularly from opposite edges the base 72. The lower clamp 50 having a proximal end and a distal end, the proximal end of the lower clamp 50 protrudes from the opening in the housing 12. Two opposite apertures 76 in the pair of flanges 74 are positioned near the center of the length of the lower clamp 50 and can be used to secure the lower clam 50 to the upper clamp 44. The apertures 76 are positioned to be registered with the apertures 64 of the upper clamp 44, wherein the lower clamp 50 can be pivotally mounted to the upper clamp 44 at the apertures 76. The four apertures 78 near the proximal end of the lower clamp 50 can secure the lower cushion 80. FIG. 8 shows the upper cushion 70 and the lower cushion 80 which together forms a passageway for the hose 30. Both the upper cushion 70 and the lower cushion 80 can have a longitudinal groove facing each other, such as to form the passageway for the air hose 30 and the nozzle 20.

The power supply to the inflation system 10 can be transmitted through a power cord, wherein the power interface 22 can receive the power cord. The power interface 22 can also be provided with a fuse to protect any damage from electricity. The power cable can be interrupted with a foot-pedal switch, such that the foot-pedal switch can be pressed to allow the power to transmit to the inflation system 10. Releasing the foot-pedal switch cut-off the power supply thereby turning the inflation system 10 off. It will be appreciated by a skilled person that any other mechanism to turn the inflation apparatus on and off is within the scope of the present invention.

In one embodiment, disclosed is an inflatable packaging airbag that can be manufactured in a bag like configuration. The bags herein include all types of packaging bags for storage and transportation of an article and includes mailing envelopes. The bag can have a range of shapes, however, the two shapes i.e. square and rectangular are most common. Also, the bag disclosed herein can be manufactured in assorted sizes. The bag can have a front wall and a rear wall also referred herein as the front side and the rear side of the bag respectfully. Each of the front side and the rear side of the bag can have an absolute or a relative bottom edge, opposite left and right edges, and the top edge. The bottom, left, and right edges of the front side and the rear side can be welded to form an enclosed bag body. The packaging bag disclosed herein can also be configured as a gusset bag. Additionally, the front wall and the right wall can be a continuous sheet folded to form a bag. Folding also gives the bag a gusset bag like appearance. In one implementation, the front side and the rear side of the bag forms a mouth for receiving an article into the bag. At least one of the front or rear sides of the bag can extend further from the mouth opening to form a flap. The flap can be configured to fold over and couple to the wall opposite the wall having the flap for closing the mouth of the bag. Alternatively, two flaps can extend from each the front side and the rear side of the bag. The two flaps can stick with each other to close the mouth of the bag. Herein the mouth is also referred to as an opening of the bag. The flap can be provided with an adhesive liner, that traverses the flap, and configured for coupling the flap to the opposite wall of the container or the opposite flap, as the case may be. The adhesive liner can be an adhesive that can couple the flap to the wall of the bag. The adhesive liner can extend along the length of the flap and is of a predetermined width.

In a preferred implementation, a pair of spaced-apart adhesive liners are configured on the flap. The pair of adhesive liners includes a first adhesive liner and a second adhesive liner each extends along the length of the flap and are parallel to each other. Between the first adhesive liner and the second adhesive liner is configured a line of weakness along which the flap can be torn for gaining access to the interior of the bag. The line of weakness can be spaced perforations formed in the flap by a perforator. However, any other means of forming a line of weakness can be used. The line of weakness extends edge to edge along the length of the flap and parallel to the first adhesive liner and the second adhesive liner. The first adhesive liner, the line of weakness, and the second adhesive liner are spaced apart sufficiently to be functionally independent of each other. The first adhesive liner and the second adhesive liner can be protected by a release liner, such as a wax paper. Construction and working of release liners for temporary protecting an adhesive layer are known in the art. Also, adhesives used to couple one sheet to another sheet including a plastic sheet to a paper or a plastic sheet to a plastic sheet are known to a skilled person and any such adhesive is within the scope of the present invention.

In a preferred implementation, also disclosed is a method of storing and transporting an article using the disclosed bag. At first, an article to be stored and transported can be put into the bag. Once the article is in the bag, the release liner of the first adhesive liner can be removed. The first adhesive liner is the outermost adhesive liner away from the bag. Thereafter, the flap can be folded and secured to the opposite wall of the bag, wherein the first adhesive liner sticks to the outer surface of the bag. Depending upon the type of adhesive, the first adhesive liner can stick to the side of the bag. For example, if the adhesive is a pressure-sensitive adhesive, suitable pressure can be applied over the flap for sticking the adhesive liner to the side of the bag. In case, the adhesive is heat-sensitive adhesive, suitable heat can be applied to bond the adhesive liner to the wall of the bag. It is to be understood that, in case, the bag is having two opposite flaps or a single continuous flap running along the periphery of the mouth of the bag, opposite flap portions can couple through the adhesive liner. The adhesive liner can be provided on one portion of the two opposite portions of the flap or both opposite portions can be provided with adhesive liners. Preferably, the adhesive is a permanent type adhesive, such that the bag cannot be open without tearing the flap or the bag.

The bag sealed through the first adhesive liner can be stored and transported. To gain access to the interior of the bag, that is sealed at the first adhesive liner, the outer segment of the flap along the line of weakness can be torn. Tearing of the flap opens the mouth of the bag, and the article in the bag can be removed. The removed article or any other article can again be put into the same bag. After putting the article, the release liner of the second adhesive liner can be removed, and the flap at the second adhesive liner can be coupled to the opposite wall of the bag or the opposite flap, as the case may be. The two adhesive liners separated by the line of weakness allows the same bag to be used twice. For example, the same bag can be used to securely return an article.

In one aspect, the packaging bag can be configured with an inner inflatable liner. The inflatable liner can be a protective buffer against any shocks and bumps that may otherwise damage an article contained in the bag. The inner inflatable liner includes a series of inflatable tubes of prolonged cylindrical configurations that are arranged side by side. Each inflatable tube is having an opening preferably at its end. Each inflatable tube is in fluid communication with a common air tube. One end of the common air tube is closed while the other end forms an inflation port. The inflation port can be an aperture or slit through which air under pressure can be drawn into the common air tube and from the common air tube into the inflatable tubes resulting in their inflation. The opening of the inflation tubes can be interrupted by a check valve. The check valve also known as one-way-valve can be configured at the opening of the inflatable tubes to allow air to enter into the bars but does not allow the filled air from the bars to leak out through the opening. The use of a check valve is advantageous in prolonging the life of the inflatable liner and limiting the spread of any damage to the functional portion of the inflatable liner. This is because any leaked tube will not cause the deflation of the whole inflatable liner. Thus, one or two damaged tubes will not make the inflatable liner ineffective. Moreover, the inflatable liner can be removably inserted into the bag, thus allowing the inflatable liner to be used again.

Figure 12:
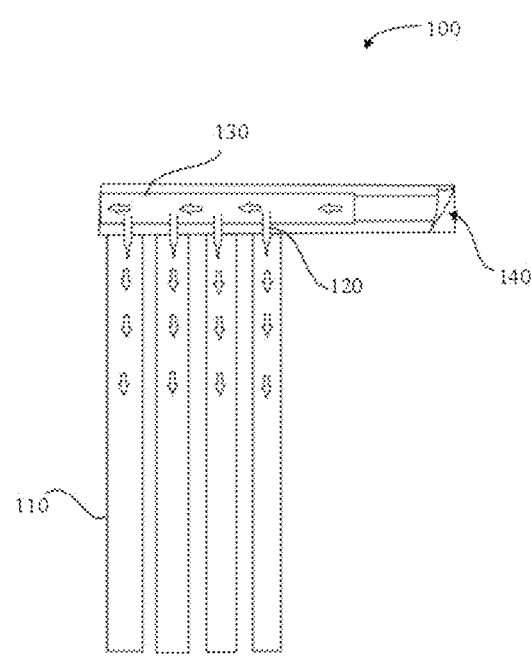
FIG. 12 shows one implementation of an inflatable liner, according to an exemplary embodiment of the present invention.

Now referring to FIG. 12 which shows an implementation of the disclosed inflatable liner. The inflatable liner 100 is shown to have a series of tubes 110 that are arranged side-by-side and aligned with each other at their ends. The number of tubes and the length of the tubes can vary based on the size of the article to be packed. A larger sized article will require a bigger package and thus a larger number of tubes. It is also possible that the inflatable liner disclosed herein can have a series of tubes arranged in rows. Such an inflatable liner with rows of tubes can be particularly suitable for large articles. Additionally, the margin between rows can provide for the folding of the inflatable liner, referred hereinafter as the fold lines.

Each tube in FIG. 12 is shown to have a check valve 120 integrated into an opening of the tube. Each tube is having an opening at its end through which air can enter into the tube. The check valve allows fluid to pass through only in one direction. The check valve integrated into the inflatable liner allows the air to enter the tube but does not allow the filled air to leak from the opening of the tube. The islanding of each tube through the check valve saves the inflatable liner from becoming useless when one or two tubes are damaged. Without the check valve, the air from all the connected tubes will finally leak out from the damaged tube rendering the inflatable liner useless. During packaging and transporting, there are chances that the inflatable liner itself gets damaged by sharp objects, thereby unprotecting the article from shocks. The inflatable liner disclosed herein overcomes the shortcoming of conventional inflatable liners, wherein any damage to the tubes does affect the other tubes. The remaining tubes can continue protecting the article. Moreover, the inflatable liner can be reused multiple times thus making it more economical.

The series of tubes in a row can connect to a common tube 130, shown in FIG. 12. The common tube 130 is also referred herein as the common conduit. One end of the common tube 130 can be closed while the other end can be configured as an inflation port 140. The inflation port can be an aperture or a slit that can be connected to a hand pump or electric inflator for inflating the connected series of tubes. FIG. 12 shows a slit configured as the inflation port 140.

Figure 13:
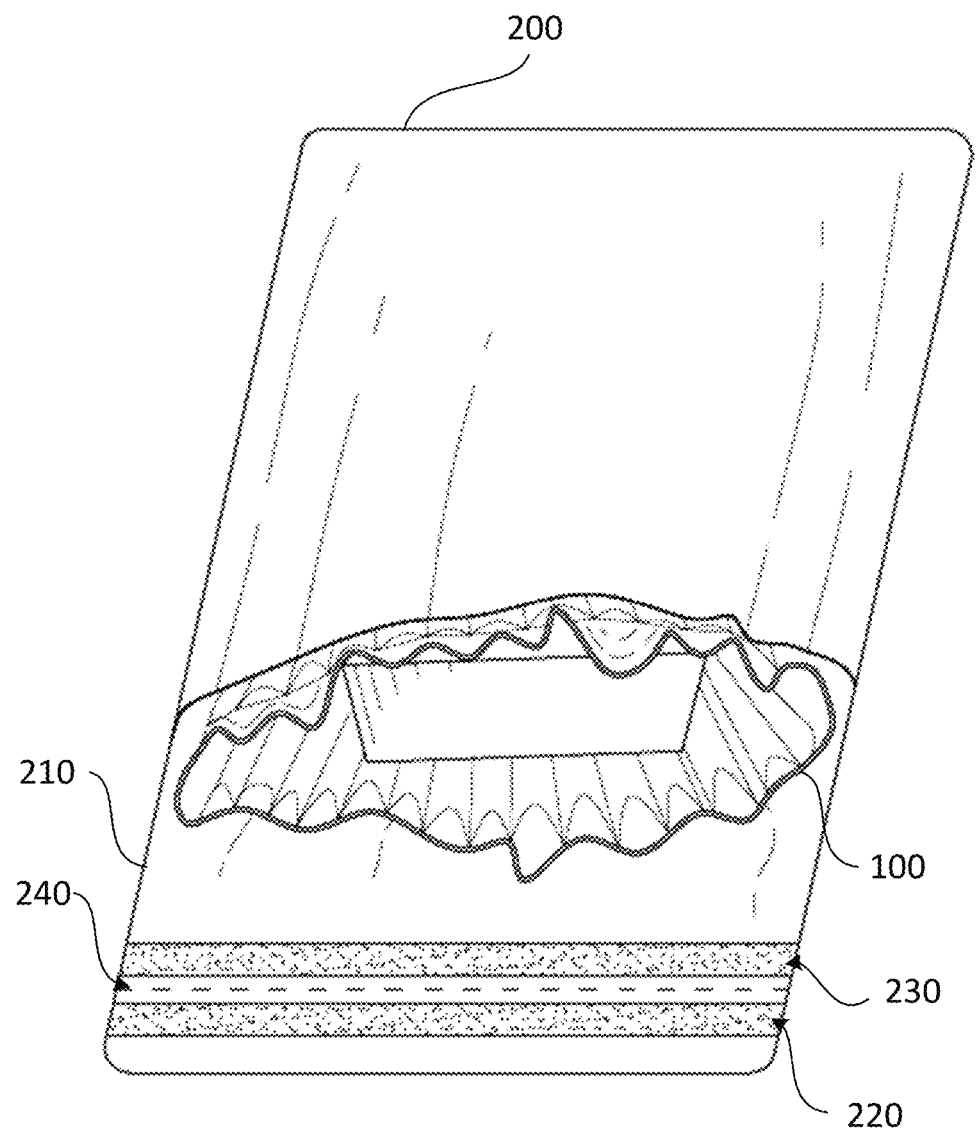
FIG. 13 shows one implementation of an inflatable airbag having the inflatable liner of FIG. 12.

FIG. 13 shows one implementation of the bag 200 having the inflatable liner 100. The packaging bag 200 shown in FIG. 13 is a rectangular enclosed body having one opening, also referred herein as the mouth. The opening can receive an article or product to be stored and/or transported. The bag 200 is having a front side and a rear side, wherein the front side and the rear side are closed at three edges, while the fourth edge is open forming mouth of the bag 200. The rear side, as shown in FIG. 13, extends further from the mouth opening forming a flap 210. The flap 210 is configured as a fold-over-flap that can fold and stick to an outer surface of the front side of the bag 200, thus closing the mouth opening. The flap is shown to have the first adhesive liner 220 which is positioned on the extreme side of the flap 210 away from the mouth opening. A second adhesive liner 230 is shown adjacent to the mouth of the bag 200. A line of weakness 240 runs parallel and between the first adhesive liner 220 and the second adhesive liner 230. It is to be understood that FIG. 13 shows the bag having the fold-over-flap extended from the rear side, it is within the scope of the present invention the bag having a second flap that extends from the front side, wherein the first flap and the second flap can couple to close the mouth of the bag. The bag can be made of kraft paper, plastic, and like materials known in the art for manufacturing the packaging articles. The inflatable liner can preferably be made of any flexible material that is durable enough to withstand any external shocks and bumps. Preferably, flexible polymeric materials like polyethylene can be used.

Figure 14:
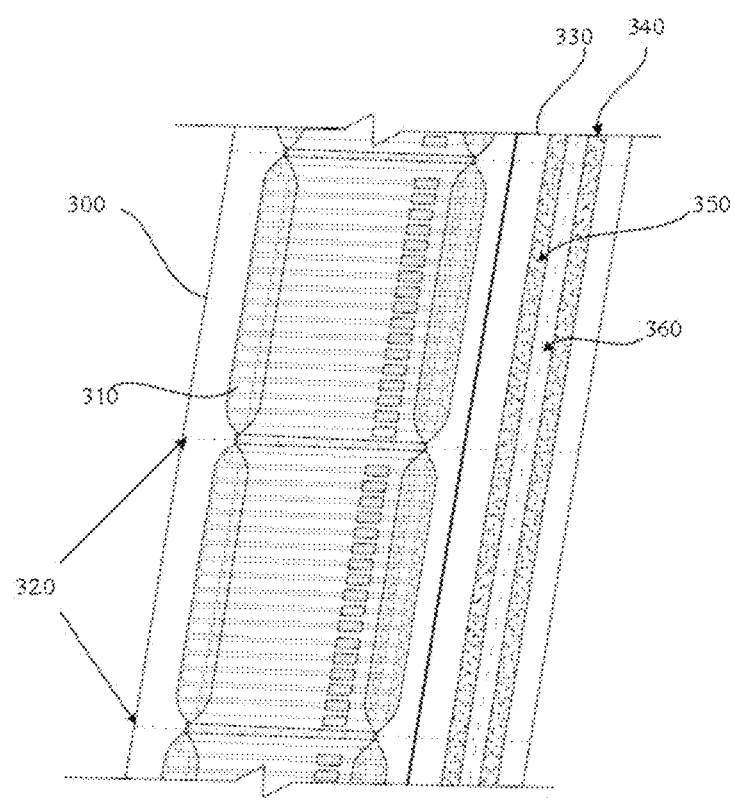
FIG. 14 shows another implementation of the inflatable airbag, according to an exemplary embodiment of the present invention.

FIG. 14 shows one implementation of a bag, which is an inflatable packaging airbag. FIG. 14 shows multiple inflatable packaging airbags 300 connected through a line of perforations 320, refereed hereinafter as the series of bags or the continuous series of bags. The line of perforations provides for a line of reduced tear resistance, such as a bag at the end of the series of bag that can be torn along the line of weakness. The continuous series of bags can be manufactured in a machine. A perforator installed with the machine produces the line of weakness in the series of bags moving in the machine direction. As shown in FIG. 14 each bag of the series of bags has an inflatable liner 310. The inflatable liner 310 can be similar to the inflatable liner described above. The inflatable liner 310 includes a series of inflatable tubes arranged side by side and aligned at the ends. Each bag can have two sheets of inflatable liner configured in a face to face relation. The inflation ports of the two sheets of the inflatable liner can be coupled to form a common inflation port. Alternatively, a single inflation liner can be folded in a U-shaped configuration.

The bag 300 can be formed by welding two sheets in a face to face relation. The two sheets from the front side and the rear side of the bag. The three edges, including the left edge, right edge, and the bottom edge are welded to form an enclosed body. The top edge is free forming an opening of the bag. Two continuous sheets from two rolls can form the continuous series of bags shown in FIG. 14. Alternatively, a single sheet can be folded to provide the bags. Any excess margins from the bags can be trimmed. The margins between two consecutive bags can have a traversing line of perforation 320. In one case, double side adhesive tapes can be applied to the flap forming a first adhesive liner 340 and a second adhesive liner 350. A line of weakness 360 can be configured between the first adhesive liner and the second adhesive liner. The inflatable liner 310 can be configured as a wall of the airbag or attached to the inner surface of the bag at specific areas. For example, the bag along its perimeter of the mouth opening can be attached to the inflatable liner, while the rest of the inflatable liner can float in the bag. This floating attachment of the inner inflatable liner into the bag allows for the flexibility of the tubes of the liner during the "form, fill, label, seal" manufacturing process. Moreover, the inner inflatable liner can be multi-gusseted, in order to fold, thus minimizing the shipping dimensions. The packaging bags disclosed herein can also be provided with a GPS tag for tracking the location of the package. Furthermore, each bag can also be provided with several "marked through holes" for automated warehouse handling/pick-n-place and for "drone" delivery. The "marked through holes" can also function as mechanical grab points for lifting and transporting a package. Alternatively, "marked through holes" can be replaced with flat spots for "vacuum grab point". Still in an alternate implementation, spots of ferrous material can be embedded that acts as a magnetic attachment points for lifting the package.

In one implementation, the inflation liner is having a front side and a rear side both in a face to face relation. The inflation liner can be manufactured to have one or more edges of the front side and second side to be continuous i.e. the front side and the rear side of the inflation liner can have one or more common edges. The common edges can be configured with a line of weakness, such as a line or perforation. When the inflation liner is filled with air, the pressure exerted by the filled air causes the tearing of the line of weakness, separating the front side of the inflatable liner from its the rear side.

The continuous series of inflatable bags shown in FIG. 14 can preferably be used in a warehouse for the packaging of articles. The continuous series of inflatable bags can be provided in a deflated state as a stack of sheets fan-folded or in the form of a roll. The filling of the continuous series of bags can be automated using an electronic inflator. The inflator can include a long cylindrical inflation tube with a blunt end and patterned gas escape holes for inflating the inflatable packing vessel. The blunt end of the inflation tube can have a geometric designed "double flat area" in which nip rollers can trap the bag's inflation port. The nip rollers can be constructed of a neoprene silicon singularity or composite with a hollowed internal structure. Offering key perpendicular and cylindrical engineered calculated force and surface tension are key performance items of the engineered nip rollers inclusive of strung continuous inflatable vessels in a controlled longitudinal tension in the gas inflation tube plane. The inflator can include an opposing pressure, heat seal and/or ultra-sonic sealing mechanism(s) whereby the inflated vessel, with "to be shipped article" can seal the open end(s) of the inner vessel sides and the outer "skin" vessel sides simultaneously and in a common manner. The bags can be provided with tags that can be identified by the inflator for positioning the bags. The tags can be optical tags, RFID, NFC, and similar tags. The inflator can include a corresponding reader to identify the tags. One or more tags can include additional information that can be read by the inflator. For example, RFID tag may contain information including the air pressure, quantity of air, and like.

Figure 15:
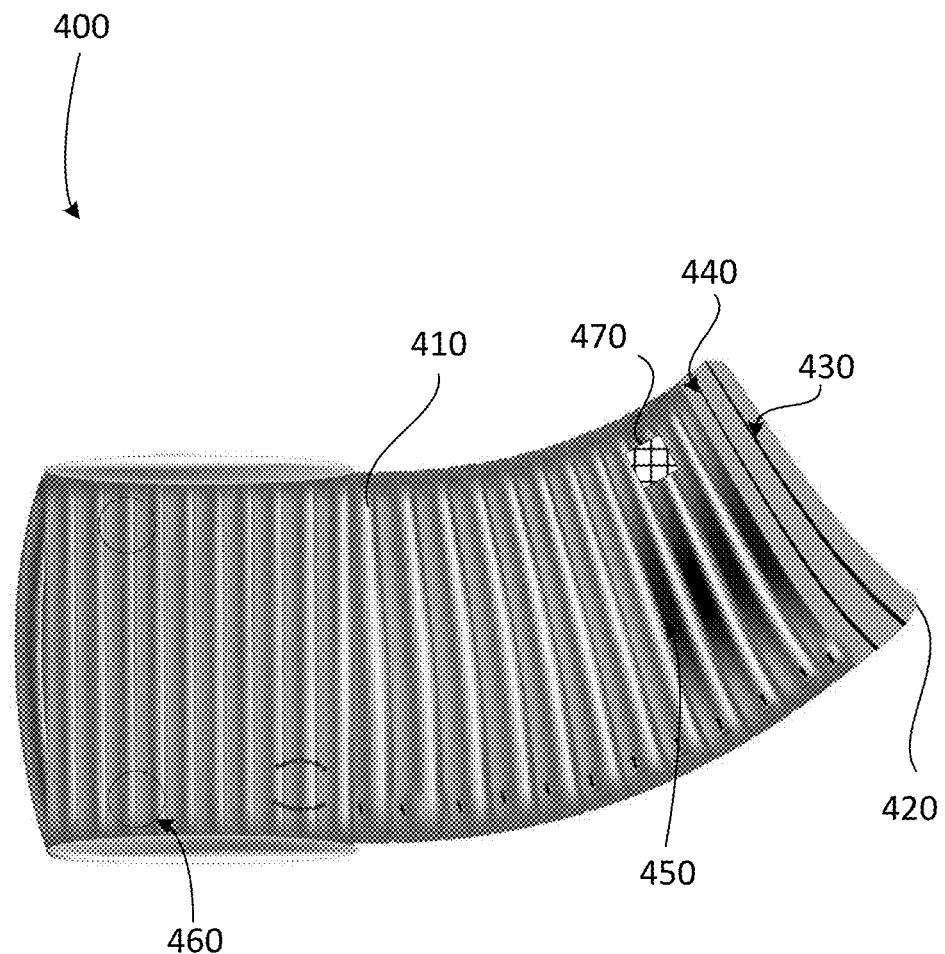
FIG. 15 shows another implementation of the inflatable liner, according to an exemplary embodiment of the present invention.
Figure 16:
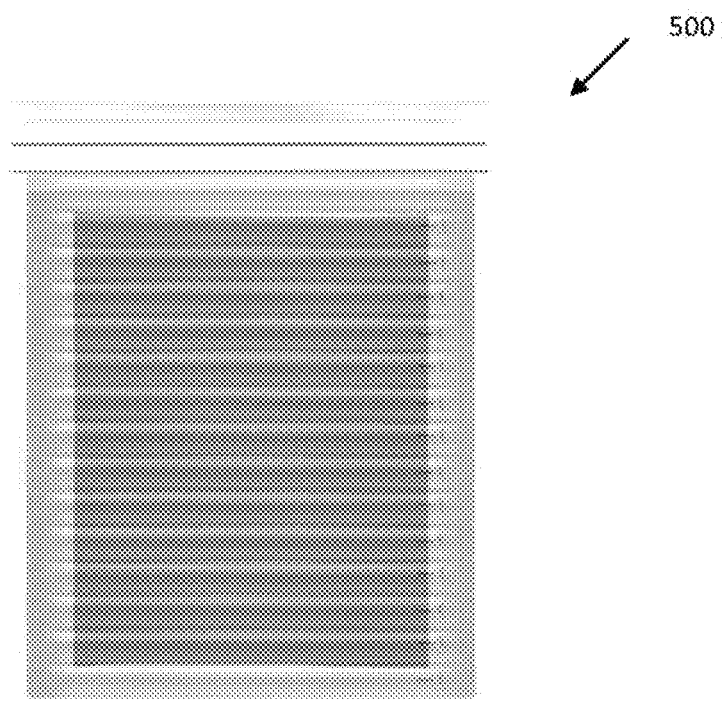
FIG. 16 shows another implementation of an inflatable liner, according to an exemplary embodiment of the present invention.
Figure 17:
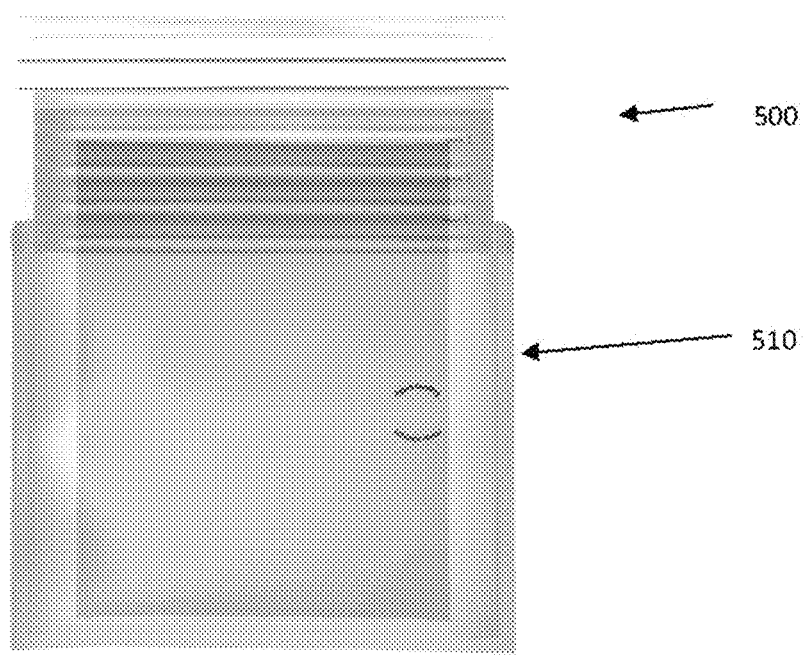
FIG. 17 shows another implementation of the inflatable airbag having the inflatable liner of FIG. 16.

FIG. 15 shown another implementation of an inflatable liner 400 disclosed herein. The inflatable liner 400 is of prolonged configuration having a plurality of channels 410 that are located parallel to the length the flap or opening. The inflatable liner 400 can be folded to provide a gusset bag. The inflatable liner is further having a flap 420. The flap 420 having a first adhesive liner 430, a second adhesive liner 440, and a line of weakness (not shown) running between the first adhesive liner and the second adhesive liner. Top flap folds over to encapsulate a shipping item providing 360-degree protection. The channels 410 shows a hinge point which is the column seal. The outer skin (not shown) has the double tape with perforation seal. Also, this configuration allows for fully automatic (by hands free) inflation via machine. Also, the outer skin can be heat sealed by the automatic inflation, seal, perforation bursting machine. FIG. 16 shows another implementation of the inflatable line 500 having the inflatable channels in parallel configuration with the flap. The bags in FIG. 14 have the channels arranged in perpendicular configuration. FIG. 17 shows the outer skin 510 of the inflatable liner. The other skin pinches the folded top opened vertical columns together. Also, it can be seen in FIG. 15 are marked through holes 460 that can be used as mechanical grab points to hold and transport the package, dark area showing a patch 450 of ferrous material, and a tag 470. In one case, more than one tag can be applied.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method of inflating a packaging airbag, the method comprising:
   providing an airbag, the airbag comprising:
      a packaging body, the packaging body comprises:
         a front wall, the front wall has a top edge;
         a rear wall, the rear wall has a top edge, wherein the top edge of the front wall and the top edge of the rear wall forms an opening for receiving an article; and
         a first adhesive liner coupled to an inner surface of the rear wall, the first adhesive liner positioned adjacent to the top edge of the rear wall, the first adhesive liner runs along and parallel to the top edge of the rear wall;
         a second adhesive liner coupled to an inner surface of the rear wall, the second adhesive liner adjacent to the first adhesive liner, the second adhesive liner runs along and parallel to the first adhesive liner, wherein the first adhesive liner and the second adhesive liner comprises a permanent adhesive; and
         a line of weakness in the rear wall runs parallel to the first adhesive liner and between the first adhesive liner and the second adhesive liner; and
      an inflatable liner having an inflation port.

2. The method according to claim 1, wherein the inflatable liner is placed into the packaging body.

3. The method according to claim 1, wherein the inflatable liner comprises a series of inflatable tubes arranged side by side, each inflatable tube having an opening, the series of inflatable tubes in fluid communication with a common air tube through the opening, one end of the common air tube configured as the inflation port, the opening of the each inflatable tube is configured with a check valve, the check valve configured to allow air to enter the inflatable tube but restrict the leak of filled air from the opening of the inflatable tube.

4. The method according to claim 3, wherein the method further comprises the steps of:
   removing a first release liner from the first adhesive liner exposing the permanent adhesive of the first adhesive liner;
   sticking the first adhesive liner to the front wall for closing the opening;
   tearing along the line of weakness for gaining access to an inner volume of the packaging body;
   upon tearing, removing a second release liner from the second adhesive liner exposing the permanent adhesive of the second adhesive liner; and
   upon tearing and removal of the second release liner, sticking the second adhesive liner to the front wall closing the access to the inner volume of the packaging body.

5. The method according to claim 1, wherein the airbag further comprises a plurality of tags, the plurality of tags configured for aligning the airbag on an inflation system, wherein the inflation system comprises a reader to sense the plurality of tags.

6. The method according to claim 5, wherein at least one tag of the plurality of tags further comprises details of air pressure and quantity of air to be filled in the inflatable liner.

7. The method according to claim 1, wherein the line of weakness is a series of spaced perforations.

8. The method according to claim 1, wherein the airbag further comprises at least one patch of a ferrous material embedded in the packaging body, the at least one patch configured for magnetic coupling.

9. The method according to claim 1, wherein the airbag further comprises marked through holes as mechanical grab points for lifting and transporting the airbag.

10. The method according to claim 1, wherein a first length of the front wall from a bottom edge to the top edge of the front wall is same as a second length of the rear wall from a bottom edge to the top edge of the rear wall.

11. The method according to claim 1, wherein a first length of the front wall is from a bottom edge to the top edge of the front wall and a second length of the rear wall is from a bottom edge to the top edge of the rear wall, wherein the second length is larger than the first length, wherein a top portion of the rear wall forms a fold-over-flap, the fold-over-flap configured to fold over the front wall, and wherein the first adhesive liner, the second adhesive liner, and the line of weakness are on the fold-over-flap.

* * * * *